June 7, 1955   T. GULBRANDSEN   2,709,864
MACHINE FOR AND METHOD OF ASSEMBLING TILE
Filed Aug. 21, 1952   12 Sheets-Sheet 1

Inventor:
Trygve Gulbrandsen,
by Thomson & Thomson
Attorneys

June 7, 1955 T. GULBRANDSEN 2,709,864
MACHINE FOR AND METHOD OF ASSEMBLING TILE
Filed Aug. 21, 1952 12 Sheets-Sheet 6

Inventor:
Trygve Gulbrandsen,
by Thomson & Thomson
Attorneys

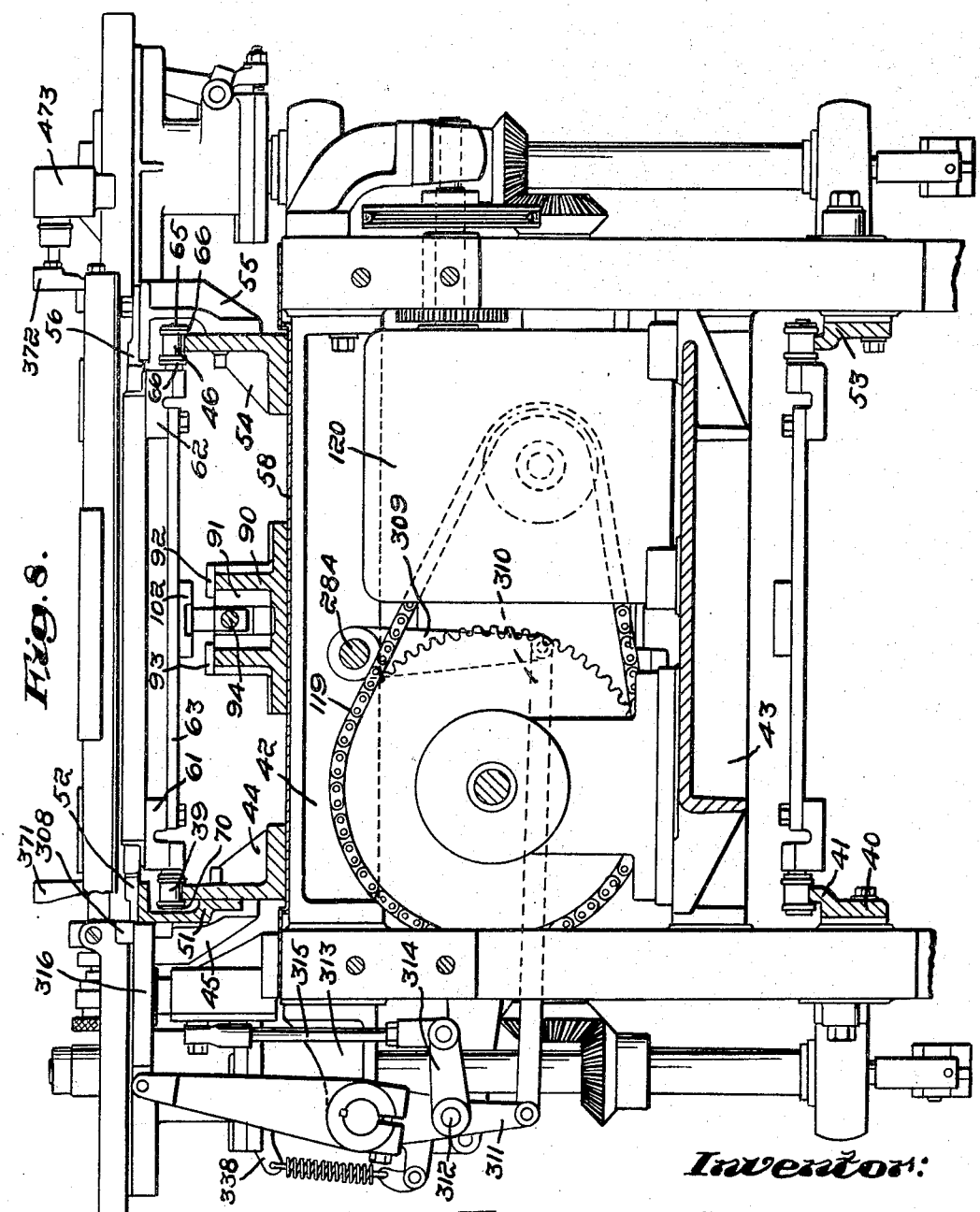

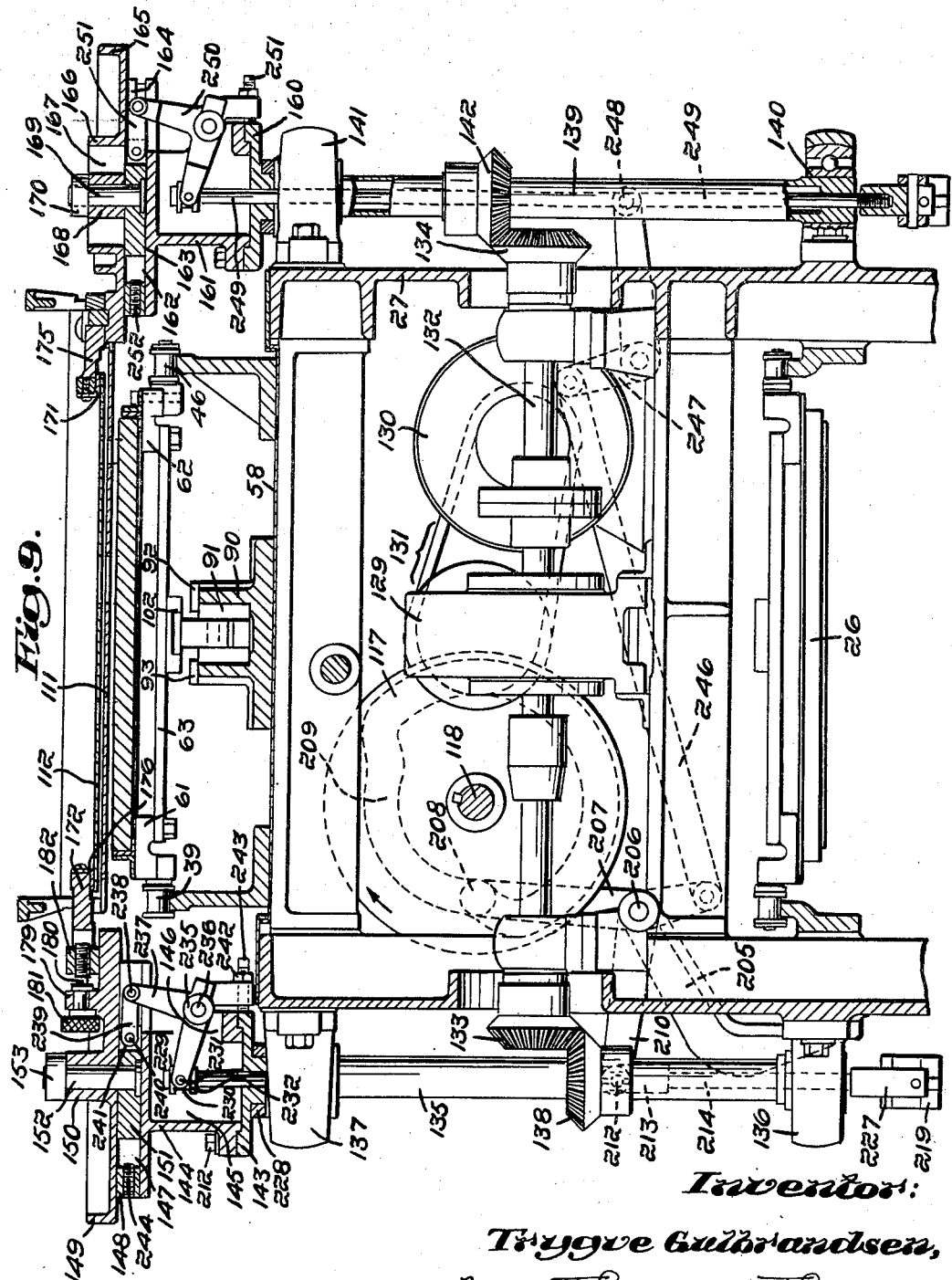

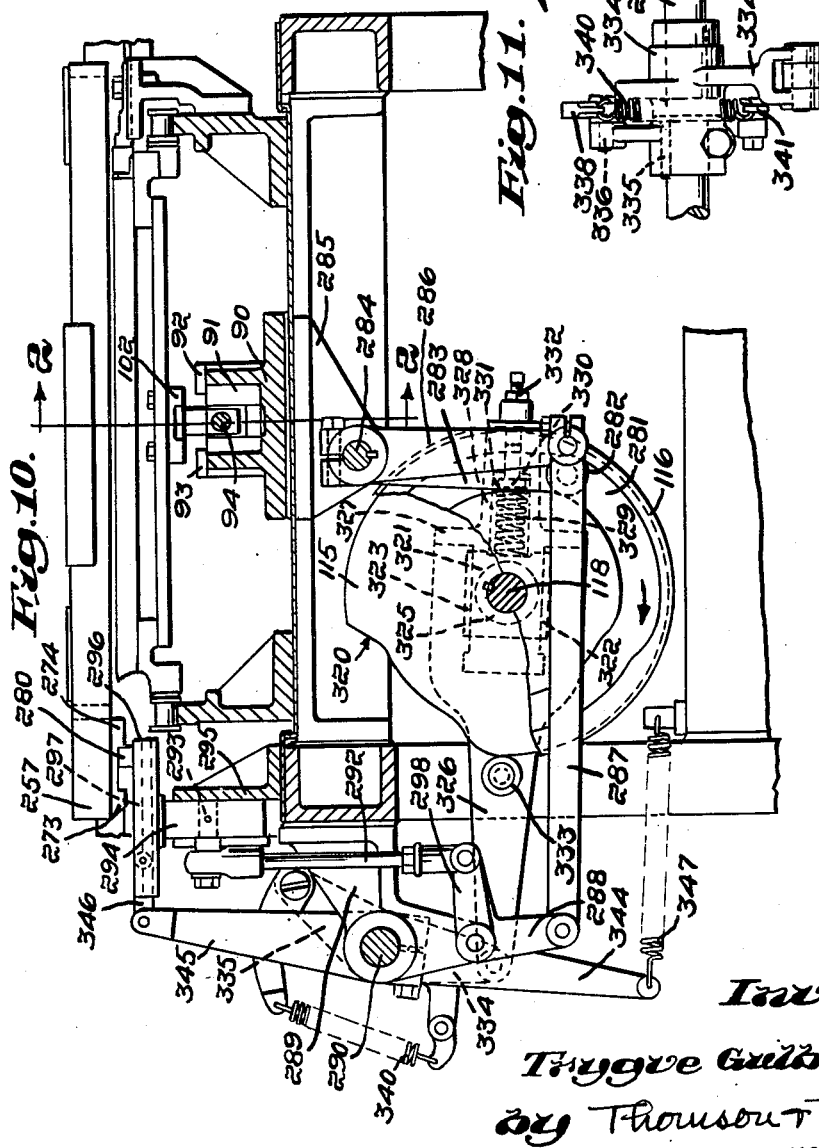
June 7, 1955 — T. GULBRANDSEN — 2,709,864
MACHINE FOR AND METHOD OF ASSEMBLING TILE
Filed Aug. 21, 1952 — 12 Sheets-Sheet 9
Inventor:
Trygve Gulbrandsen,
by Thomson + Thomson
Attorneys June 7, 1955        T. GULBRANDSEN        2,709,864
MACHINE FOR AND METHOD OF ASSEMBLING TILE
Filed Aug. 21, 1952        12 Sheets-Sheet 10
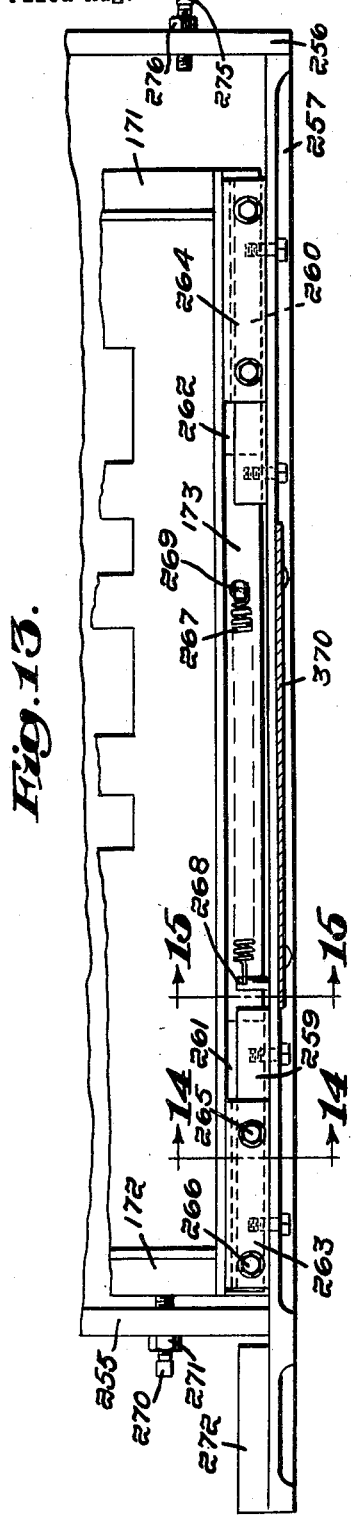
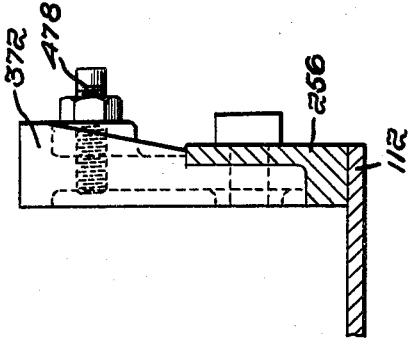
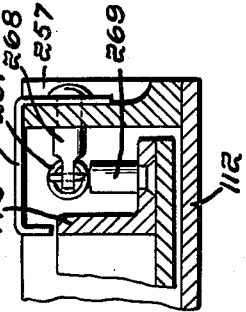
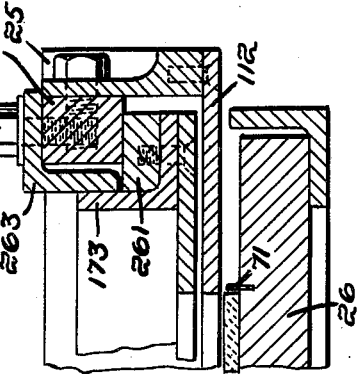
Inventor:
Trygve Gulbrandsen,
by Thomson & Thomson
Attorneys

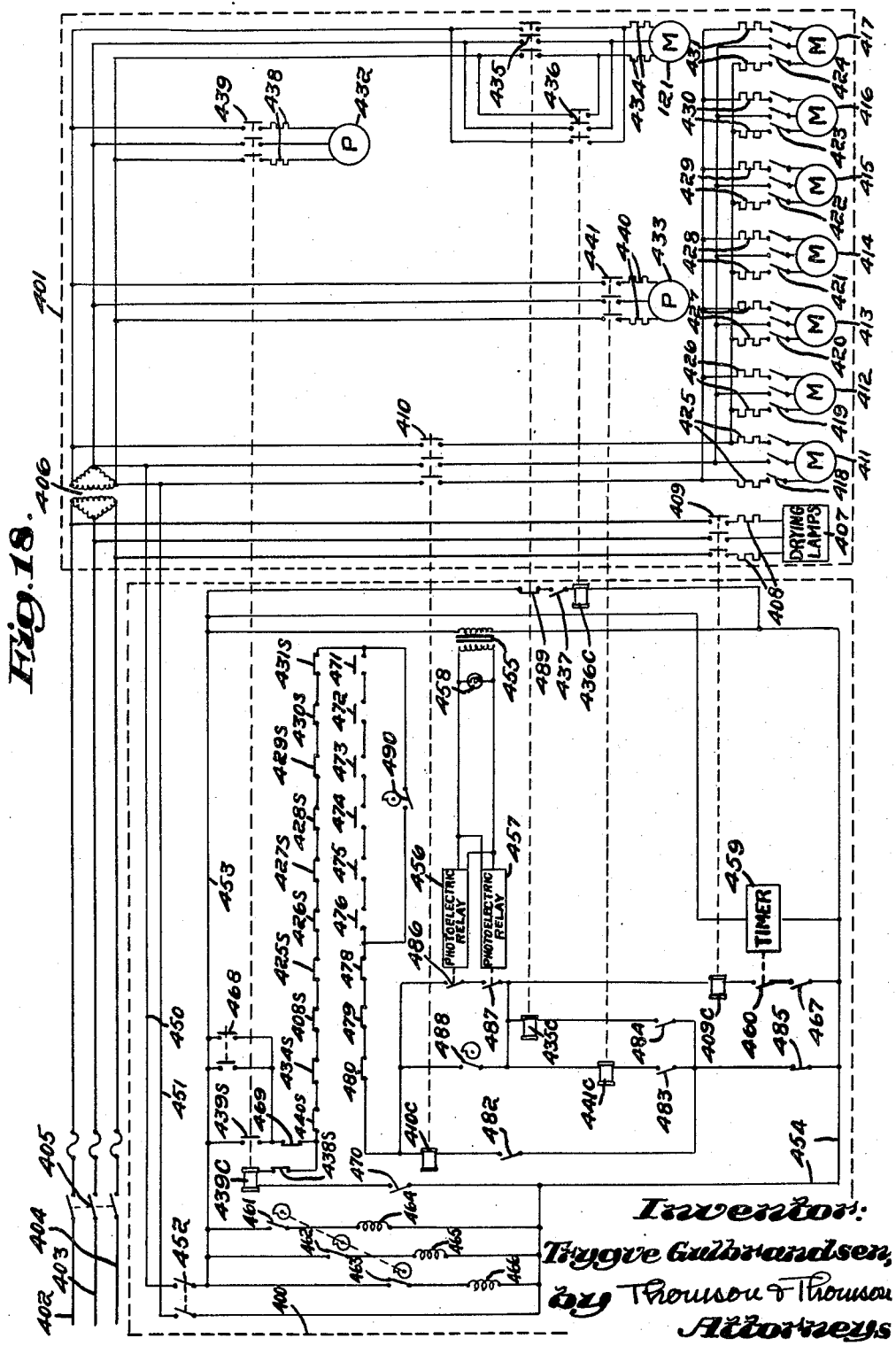

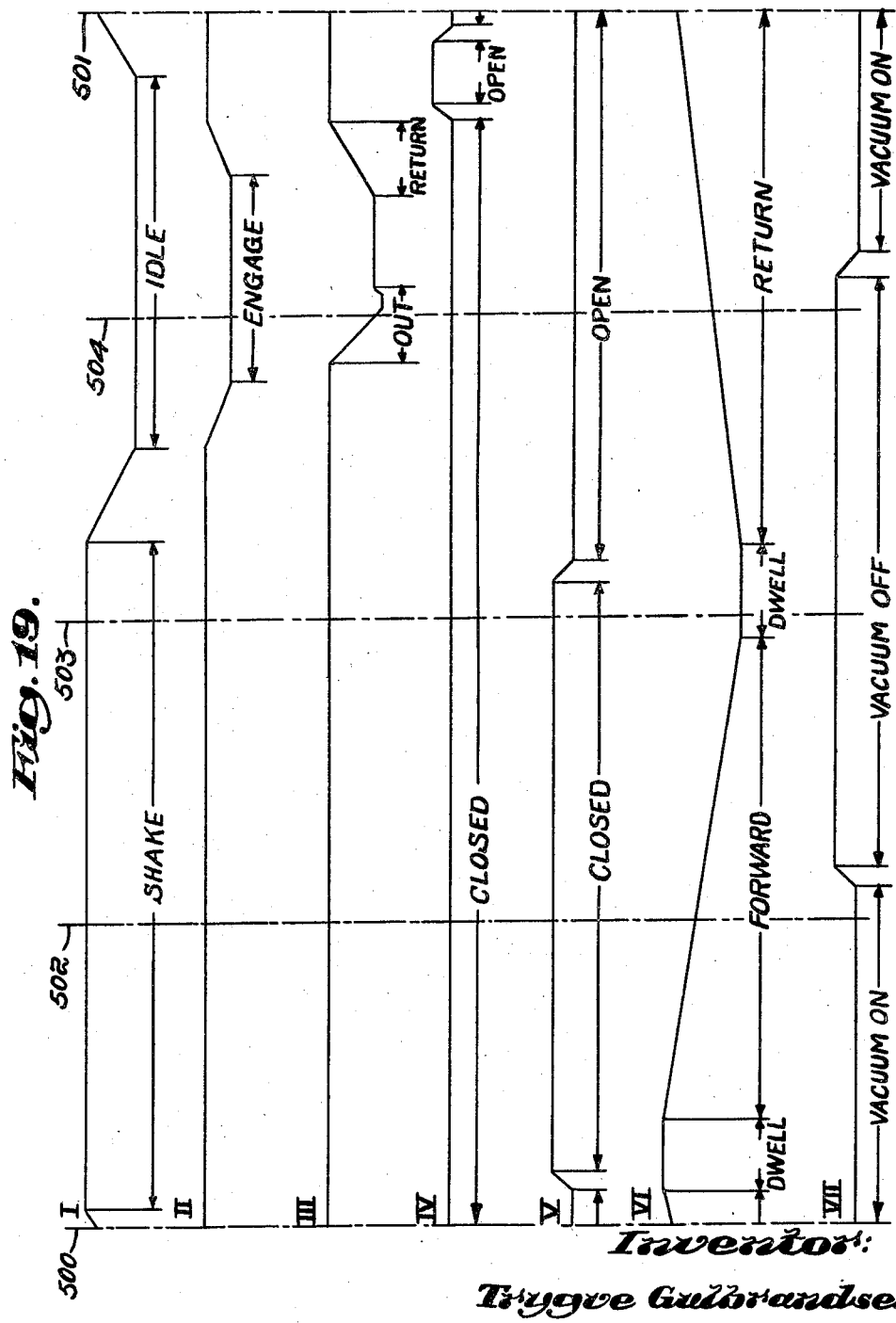

United States Patent Office 2,709,864
Patented June 7, 1955

2,709,864

MACHINE FOR AND METHOD OF ASSEMBLING TILE

Trygve Gulbrandsen, Beverly, Mass., assignor to Stylon Corporation, Milford, Mass., a corporation of Massachusetts Application August 21, 1952, Serial No. 305,562

12 Claims. (Cl. 41—1)

This invention relates to the manufacture of tile sheet by arranging individual ceramic tile in a predetermined pattern and applying a paper backing coated with adhesive. Such sheets are used in laying tile floors and walls. The sheets are laid in cement with the paper side up and the paper removed after the cement has filled in the spaces around the tile.

It is essential that sheets of tile for the purpose here described be uniform in size, so that the edges of the pattern units will correspond in laying, and that the individual tile be spaced from each other so as to allow for a cement joint around each tile. This result is usually accomplished by the use of a wooden pattern board, which is marked in the desired pattern and has appropriately located metal ridges, or partitions, forming pockets in which the individual tiles are placed. The tiles are set on the board face side up, and, when the board is filled, a sheet of paper is pasted to the tile and the completed tile sheet is lifted out. In the past, the filling of such a board has been largely a manual operation. For simple, one-color patterns, the filling process may be speeded up by dumping a quantity of tile on the board and shaking the board from side to side causing the tile to fall into the appropriate pockets. Excess tile is then removed, the unfilled spaces in the pattern completed, and imperfect tile replaced or turned over. The more complicated multicolor patterns are filled in almost entirely by hand.

Some machines have been devised for feeding the loose tile into chutes and depositing it in the desired arrangement. Most of the machines so far employed for this purpose can handle tile of only a single shape and size, are rather cumbersome, and can not readily be adapted for assembling a variety of patterns.

The object of this invention is to provide a superior method of assembling tile on a pattern board, and a tile assembling machine which eliminates most of the hand labor, which can be readily adapted to either single color or multicolor assembly, which is capable of producing any desired pattern and which can handle tile of different shapes and sizes. The machine here described facilitates inspection of the complete pattern and allows for replacement of defective tile, has apparatus for aligning the tile so as to produce sheets of uniform dimensions, is provided with means for drying the gummed backing paper and removing the finished sheets, and is easy and safe for an unskilled operator to use.

The machine consists in general of a conveyor to which a number of pattern boards are attached, a mechanism for driving the conveyor intermittently so as to cause each board to stop for a certain period at a number of stations where the various operations are performed, a series of loading mechanisms employing boards called shaker boards having holes corresponding to selected parts of the pattern, each shaker board being provided with a mechanical agitating means to distribute tile into the holes and a release mechanism for dropping the tile through onto the pattern board, a pasting device, drying means, and a lifting device for removing completed sheets.

In the drawings:

Fig. 7 is a plan view, partly broken away, of one of the loading stations;

Fig. 8 is a cross-section taken along line 8—8 of Fig. 6;

Fig. 9 is a cross-section, partly broken away, taken along line 9—9 of Fig. 5;

Fig. 10 is a cross-section, partly broken away, taken along line 10—10 of Fig. 5;

Fig. 11 is a detail of the overload release for one of the mechanisms illustrated in Fig. 10;

Fig. 12 is an end view of the detail illustrated in Fig. 11;

Fig. 13 is a detail of one end of one of the shaker board assemblies;

Fig. 14 is a cross-section, somewhat enlarged, taken along line 14—14 of Fig. 13;

Fig. 15 is a cross-section, somewhat enlarged, taken along line 15—15 of Fig. 13;

Fig. 16 is a cross-section, somewhat enlarged, taken along line 16—16 of Fig. 7;

Fig. 17 is a cross-section taken along line 17—17 of Fig. 7;

Fig. 18 is a schematic diagram of the electrical circuits for operation of the machine; and Fig. 19 is a chart illustrating the sequence of operation of the timing cams which control the operation of the machine.

Figure 1:
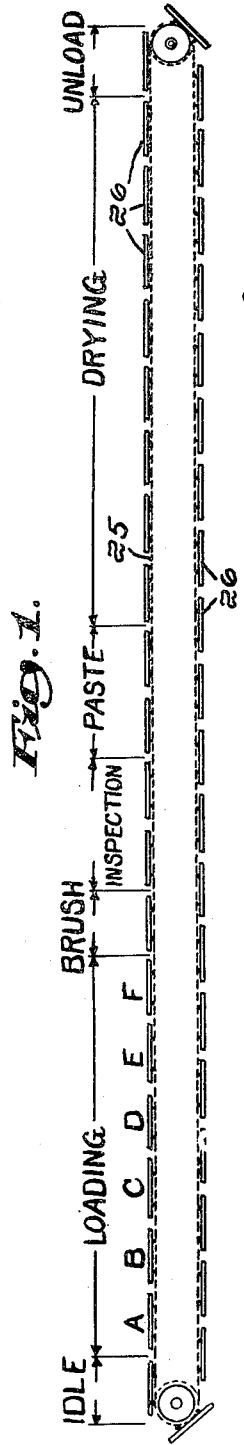
Fig. 1 is a diagram of the conveyor arrangement showing the position of the various operating stations.

As indicated in Fig. 1, the conveyor 25, which is here illustrated as a chain and sprocket type, but may be of the belt and pulley type, is arranged to travel clockwise, and carries a number of attached pattern boards 26 of a conventional type, having partitions creating pockets arranged in the desired pattern. The conveyor is here shown as equipped with forty-three boards, and travels intermittently so as to cause each board to stop at twenty-one stations where various operations are performed. At the first station on the left, marked "idle," the board is empty and may be inspected or brushed to remove dust and chips. In the area marked "loading," the board is presented in succession under six mechanisms, to be further described in detail, which fill in selected parts of the pattern. The filled board then enters the "brush" area, where a revolving brush pushes all the tile in one direction firmly against the partitions so as to insure uniformity in the size of the sheets. In the "paste" area, consisting of two stations, the gummed paper is applied and pressed over the tile. In the "drying" area, here shown as including eight stations, the completed sheet passes under infra-red lamps, the heat from which causes the paste to dry more rapidly. At the "unload" station, an automatic unloading device lifts the completed sheet from the board and carries it to a table to one side of the conveyor.

The arrangement here shown is typical for a machine designed to produce a variety of commonly used tile patterns, both monotone and multicolor, employing tile of several shapes. The number of loading stations, length of the conveyor, number of boards, and general arrangement of the other operating stations, however, may be varied to meet particular requirements, for example, two or three loading stations may be sufficient for filling in simple patterns.

The operating mechanisms of the machine are mounted on a rigid framework composed of side walls, running the length of the conveyor, connected together at intervals by cross-bars. The front side-wall construction is exemplified in Figs. 3, 4 and 5. A series of cast panels 27, each panel having access holes 28, 29 and 30 are bolted together edge to edge. Attached at intervals along the bottom of the panels are mounting lugs, as exemplified by lug 47 (Fig. 5), which is slotted to slide vertically on bolt 48. A screw 49, the head of which bears against projection 50, provides vertical adjustment for levelling the machine. The lugs provide for bolting the machine to a floor or base plate.

Figure 3:
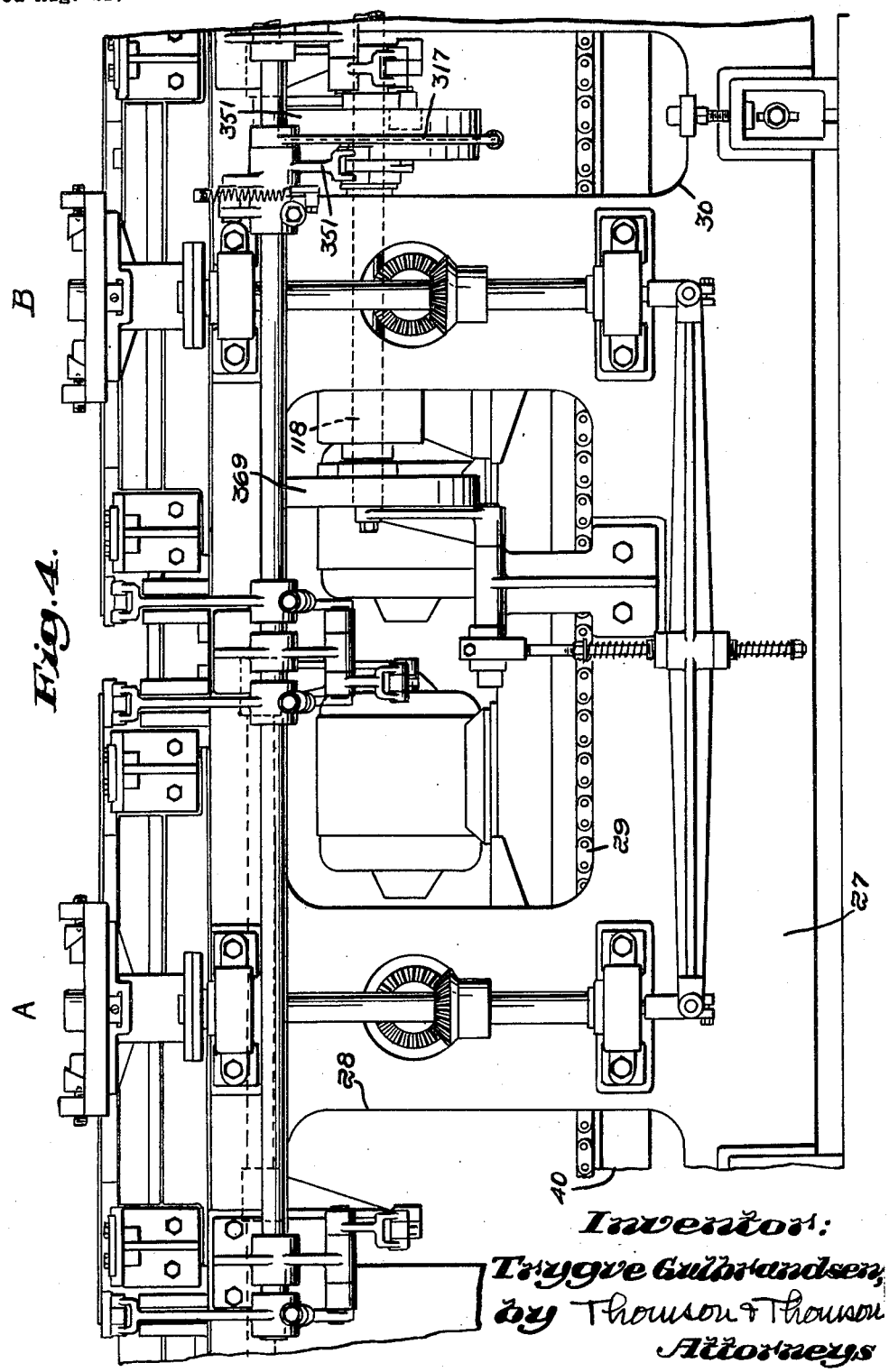
Fig. 3 is a front elevation of the left hand end of the machine.

As shown in Fig. 3, a cast bracket 31 is bolted to the left hand edge of the panel furthest to the left, and supports one of the left hand pair of sprockets. The sprocket 32 is mounted on a shaft 33 which is journalled in a bearing block 34. A guide frame 35, mounted on bracket 31, carries a pair of horizontal ways 36 and 37 in which block 34 is slidably mounted. A captive lead screw 38, attached to block 34 and threaded in the left hand side of frame 35, can be turned to move block 34 back and forth and so adjust the tension on the conveyor chain 39 which runs over sprocket 32. The right hand sprocket (not shown) is similarly mounted on a bracket on the right hand end of the machine. A bar 40, having an offset lip 41 (Fig. 8) which serves as the lower guide for chain 39, runs the length of the machine and is attached to the side wall.

The rear side wall of the frame is constructed in the same manner as the front side wall, and the two walls are connected at intervals by upper and lower cross-bars, as exemplified by bars 42 and 43, respectively, in Fig. 8. The rear bracket corresponding to bracket 31 is connected to bracket 31 by a spacer rod 57 (Fig. 3). An angle beam 44, is mounted the length of the machine on the upper cross-bars and provides the upper guide for chain 39. At each station in the loading area two brackets 45 are mounted on beam 44 and carry horizontally adjustable guide blocks 52 which serve to align the pattern board accurately under the loading mechanism. Between the brackets are mounted lengths of channel having the cross section of channel 51. The brackets and channels form a guard which overhangs the chain, running the length of the machine.

The rear end of shaft 33 is supported on an adjustable bearing block, mounted on the rear left hand frame bracket in the same manner as block 34 on bracket 31, and carries a rear sprocket similar to sprocket 32. A rear sprocket is likewise mounted on the right hand end of the machine. A second chain 46 runs over the rear pair of sprockets. A bar 53, similar to bar 40, is attached to the rear wall and forms the lower guide for chain 46 and an angle beam 54, similar to beam 44, forms the upper guide. A pair of clamps 55 carrying guide blocks 56 are mounted on the rear wall opposite the front pair of similar clamps, and channels of the same cross-section as 51 are mounted between the rear clamps to form a guard for the rear chain.

Attached to chains 39 and 46 are a number of rectangular carrier frames to which the pattern boards are fastened. One of these frames is shown in detail in Figs. 2 and 8. The frame consists of a pair of side bars 61 and 62 connected by a pair of cross bars 63 and 64. Chain 46 carries an elongated pin 65 which extends through a washer 66, into a hole in the edge of side bar 62 near the leading end. A second elongated pin 67 extends through a washer 68 into a slot 69 near the other end of side bar 62. The slot allows for slack in the chain as it rides over the end sprockets. Side bar 61 is similarly connected to chain 39 by a pin 70 extending into a hole near the leading end of the bar, and a second pin (not shown) extending into a slot in the other end of bar 61.

The pattern board 26 (Fig. 7) constructed in a conventional manner has narrow partitions or ridges 71 of a height less than the thickness of a tile, laid out according to the desired pattern. These partitions produce the required spacing between the tile. A raised boarder 72, extending around the outer edge of the board, keeps the tile from falling off. The board is mounted, by means of screws in edge 72, in an angle frame 73. Angles 74 and 75 are attached along the longitudinal edges of frame. A pair of guide blocks 76 are mounted on angle 74 so as to engage guide blocks 52 when the frame is in position at a loading station, and a similar pair of guide blocks 77 are attached to angle 75 so as to engage guide blocks 56. Frame bar 62 carries a pair of pins 78 which extend through blocks 77 and align the pattern board frame with the carrier frame.

Frame bar 62 carries a pair of swivelled dogs 79 which may be brought up through notches 80 in angle 75 and turned to lock the pattern board frame in place. The mounting of one of these dogs may be seen in Fig. 2. A pin 81, having a head 82 on its lower end, is slidably mounted in a hole in bar 62. The hole is counterbored on the under side to accommodate a coil spring 83 which presses against head 82 and tends to hold the pin down. Dog 79 is attached to the upper end of the pin. The dog may be readily locked over angle 75, or released, by pressing up on head 82 and turning the dog in the desired direction. Frame bar 61 is provided with a similar pair of dogs (not shown) which engage angle 74. The pattern board frame is thus securely attached to the conveyor, but may be readily removed without the use of tools.

Figure 2:
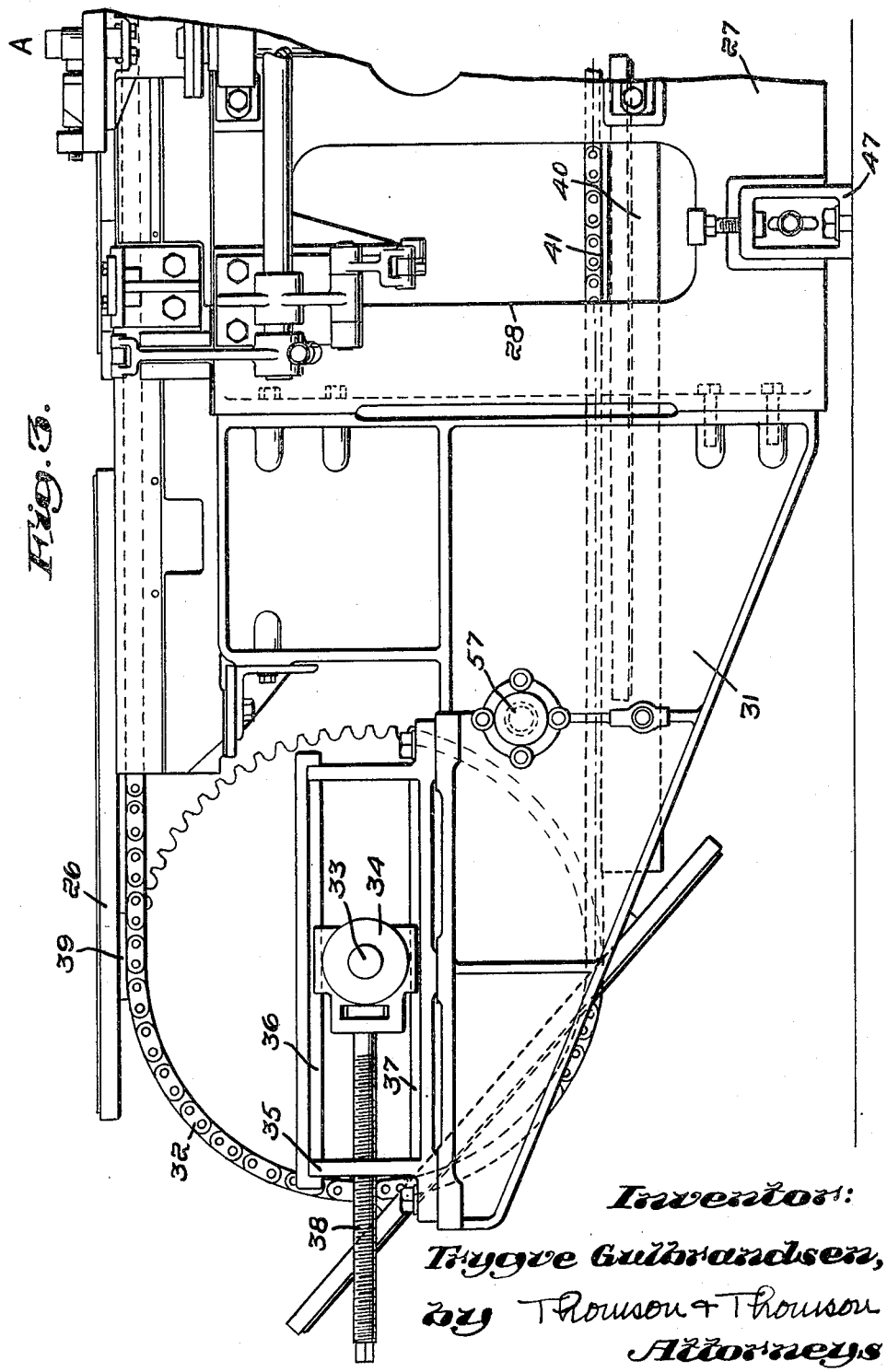
Fig. 2 is a detail of the conveyor drive, shown in vertical cross-section along line 2—2 of Fig. 10.

The conveyor is driven with an intermittent motion by the mechanism shown in Figs. 2, 8 and 10. A slide way 90 is centrally mounted on a plate 58 supported on cross-bars 42 and runs the length of the six loading stations. A number of U-shaped slide blocks, one for each station, as exemplified by block 91, are mounted in way 90. Block 91 is retained by plates 92 and 93 extending over the upper edges of the block. A coupling rod 94 is attached to the leading end of block 91, and connected to the piston rod 95 of a pneumatic thrustor 96, of conventional type, which is mounted horizontally at the level of the slide way. The piston of the thrustor is reciprocated by means of conventional valves at timed intervals, and, between strokes, rests in each of the extreme positions. In Fig. 2, the piston is shown in the extreme right hand position. The timing of the piston motion is controlled by a mechanism to be further described. Block 91 carries an L-shaped latch 97 which is mounted so as to rotate about pin 98. Arm 100 of the latch strikes against the inner horizontal surface of block 91 and acts as a stop to align arm 101 vertically in the position shown. A tension spring 99 is attached to arm 101 and tends to hold the latch in this position. A striker plate 102, the under surface of which is bevelled toward the leading edge, is centrally mounted on frame bar 63 so as to engage arm 101. A collar 103, attached to block 91, is tapped to accommodate a threaded tie rod 104 which is connected through a standard adjustable coupling 105 to the next slide block 106. Block 106 carries a latch mechanism, similar to that just described, which engages a striker plate on the succeeding carrier frame. The succeeding slide blocks, one for each loading station, each carrying a similar latch, are connected together in the same manner. When the piston is in the right hand position, as shown, each latch engages the striker plate of the carrier frame above it and aligns the frame directly under the loading mechanism despite any slack in the chain. As the piston travels to the left, the block 91 is carried back under the adjacent carrier frame, arm 101 sliding down the inclined under surface of the striker plate until clear, and then springing up to engage the plate. The five other slide blocks and mechanisms travel under the next frame in line in the same manner. The subsequent return stroke of the piston carries each frame one step along the conveyor. Suitable braking means (not shown) such as a friction belt applied to shaft 33, may be employed, if necessary, to prevent overriding of the desired position by the conveyor.

The loading of the patern board at each station is accomplished by means of a pair of boards, having matched sets of holes arranged to correspond to the occurrence of a certain type of tile in the pattern, mounted one above the other on a "shaker" mechanism which imparts a gyratory shaking motion to the pair for a certain period. A typical pair of boards is shown in Fig. 7. The upper board 111 is referred to as a "placer" board, and the lower board 112 as a "slicer" board. The holes 113 in the placer board are chamfered around the upper edges to facilitate entry of the tile. The holes 114 of the slicer board are displaced a uniform distance to the right of the placer board holes 113, so that when the right hand edges of the boards are aligned as shown, the solid portions of the slicer board cover the bottoms of the placer board holes, forming pockets into which the tile can fall. The thickness of the placer board is less than that of a tile, so that each pocket will accommodate only a single tile at a time. A quantity of loose tile, somewhat in excess of the number required to fill these pockets, is dumped on the placer board, either manually or from an overhead hopper. The two boards are shaken together causing the tile to be distributed over the placer board and fall into the pockets. The shaking motion is stopped and the two boards aligned, as shown, over the pattern board 26. A "slicer" mechanism then operates to carry the slicer board to the left, aligning holes 114 with holes 113 and allowing the tiles which found their way into holes 113 to drop through into the appropriate pockets on the pattern board. The conveyor mechanism previously described, then shifts the pattern board to the next loading station which is equipped with similarly arranged slicer and placer boards having an arrangement of holes corresponding to the occurrence of another type of tile in the pattern. The arrangement of holes in the placer boards is capable of great variation and is determined by the pattern which is desired; for example, multicolor patterns of tile of uniform shape may be composed by arranging the placer board holes to fill in a certain color at each station, and patterns may be composed of tiles of different shapes by arranging the placer board holes to fill in a certain shape at each station. In arranging the holes at each station, it must be borne in mind that the holes must be so distributed as to leave sufficient solid area in the slicer board to form a bottom for the holes in the placer board when the slicer board is in the right hand position. For this reason, tile of one shape and color can not be filled in at a single station in some patterns. Two or more stations may be employed in such cases to obtain the desired configuration of holes and solid parts in the slicer boards.

The sequence and timing of the operations of the "shaker" and "slicer" mechanisms, to be further described in detail, are controlled by means of a set of motor driven cams. Each set, consisting of three cams 115, 116 and 117, as exemplified in Fig. 5, controls the operation of two loading stations. Three sets of cams are thus required to control the six loading stations in the machine here illustrated. All the cams are mounted on a main cam shaft 118 which is appropriately supported in bearings, for example, a pair of pillow blocks as exemplified by blocks 122 and 123 at each station, inside the frame of the machine under the loading area. The cam shaft is continuously driven at slow speed through a chain and sprocket drive 119 (Figs. 6 and 8) and a gear reduction unit 120, all of conventional construction, by an electric motor 121. For an operating cycle of 15 seconds at each station, a speed of 4 R. P. M. is suitable for the cam shaft. A number of small cams (not shown in detail) which operate microswitches are also mounted on the shaft in any convenient location. These control the timing of the electrical circuits.

Figure 5:
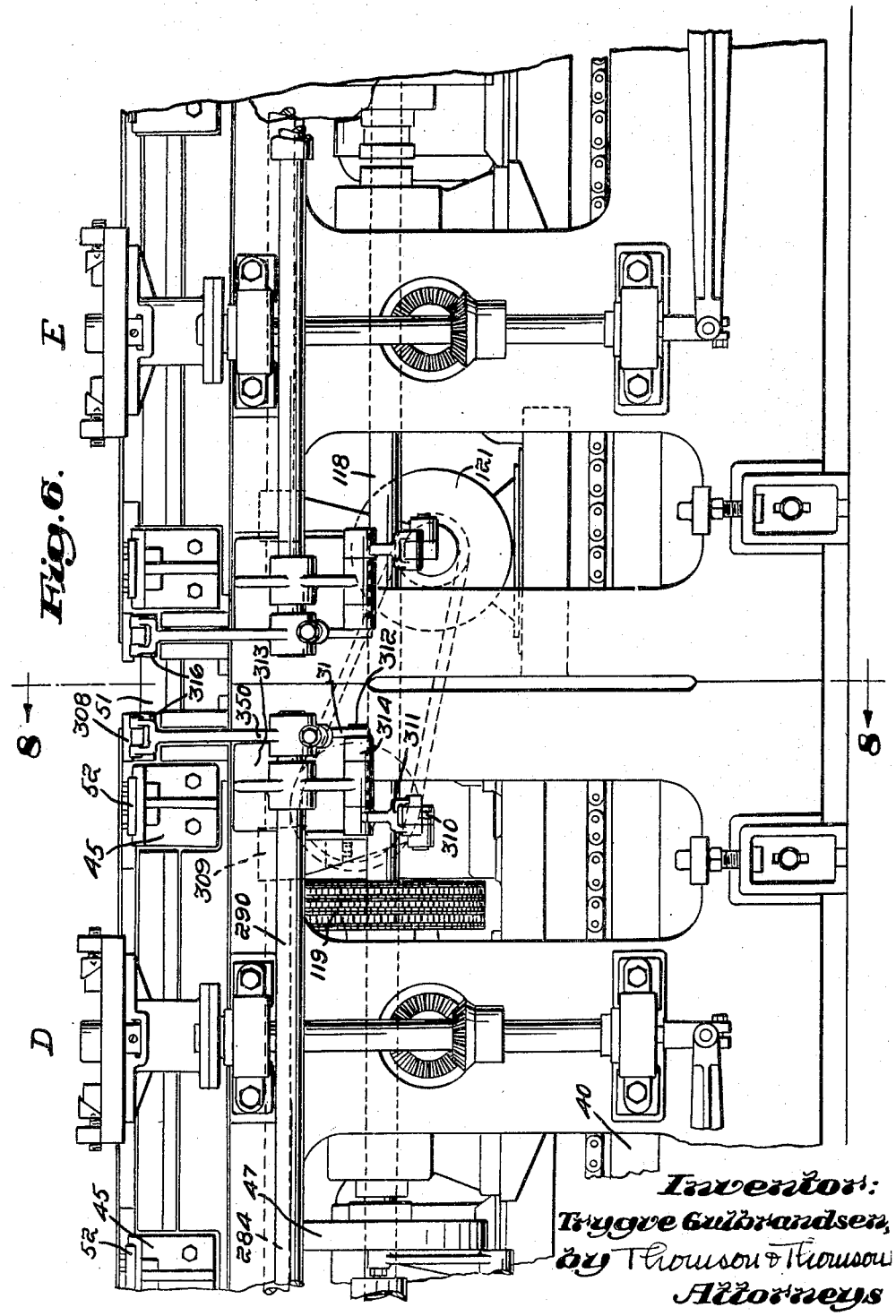
Fig. 5 is a front elevation of the loading stations corresponding to stations C and D of Fig. 1.

One of the shaker mechanisms is illustrated in detail in Figs. 5, 7 and 9. An electric motor 130 mounted underneath the conveyor, is connected through a belt drive 131 and a conventional gear box 129 to a shaft 132 which is supported transversely on the frame of the machine in any conventional manner. Mounted on either end of shaft 132 are miter gears 133 and 134. A hollow vertical shaft 135 is journalled in pillow blocks 136 and 137 mounted on the front wall of the machine, and carries a miter gear 138 which meshes with miter gear 133. A second hollow vertical shaft 139 is journalled in pillow blocks 140 and 141 mounted on the rear wall of the machine, and carries a miter gear 142 which meshes with miter gear 134. Shafts 135 and 139 are thus continuously driven in the same direction by motor 130. On the upper end of shaft 135 is a flange 143 to which is bolted a casting 144 suitably shaped to form a hollow pedestal 145, having a slot 146 on one side, a horizontal guide way 147 of inverted T-shaped crosssection, and a circular table 148. Slidably mounted on the upper surface of table 148, is a bracket 149 carrying a collar 150. An inverted T-shaped slide block 151 is mounted in way 147. A pin 152 extends up through slide block 151 and collar 150 and is secured by a cap 153. Collar 150 is freely rotatable about pin 152, so that when the pin is on dead center with respect to shaft 135, as shown, no motion is imparted to bracket 149. When the pin is shifted to one side of dead center, by an eccentric shift mechanism to be further described, a gyratory motion is imparted to the bracket.

Shaft 139 carries on its upper end, a flange 160 to which is bolted a casting 161, a duplicate of casting 144. A side block 163 is mounted in way 162, and a bracket 165 is slidably mounted on table 164. Bracket 165 carries a box 166 forming a slot 167 in which a slide block 168 is slidably mounted. A pin 169 extends through block 163 and block 168, and is secured by cap 170. Block 168 is rotatable about the pin.

One of the eccentric shift mechanisms, that for stations C and D, which periodically shifts pins 152 and 169 off center and so sets up the eccentric motion of brackets 149 and 165, is illustrated in detail in Figs. 5 and 9. A bracket 205 is mounted on the front wall of the casing and provides a bearing for a rockshaft 206. Secured to the right hand end (Fig. 5) of shaft 206 is a crank arm 207 carrying a cam follower 208 which rides in the path 209 in the face of cam 117. A rocker arm 210 is secured to the left hand end of shaft 206 and has a forked outer end 211 through which a pin 212 is fitted, loosely connecting a block 213 to the rocker arm. Threaded into the lower end of block 213 is a rod 214 on which is slidably mounted an externally threaded sleeve 215, carrying adjustable collars 216 and 217. The sleeve and collar assembly extends through a clearance hole 218 in a beam 219 longitudinally disposed outside the front wall of the machine. Engaging the lower end of sleeve 215 is a compression spring 220 retained by a nut 221 and washer 222 mounted on the lower end of rod 214. A second compression spring 223, retained by a nut 224 and washer 225 mounted near the upper end of rod 214, engages the upper end of sleeve 215. Yielding transmission of the vertical motion of rod 214 to beam 219 is thus provided.

The right hand end (Fig. 5) of beam 219 is forked, and is rotatably connected by a pin 226 to a block 227 attached to the lower end of a vertical push rod 228. The rod 228 is slidably mounted inside hollow shaft 135 and extends up into the interior of pedestal 145.

A rocker arm 235 is journalled on a pin 236 extending across slot 146 of casting 144, and has a forked upper end 237 which is rotatably secured by a pin 238 to a link 239. Link 239 is in turn rotatably secured to block 151 by a pin 240 extending across a slot 241 in the right hand side (Fig. 9) of the block.

Pinned to the upper end of push rod 228 is a clamp 229 having a circumferential groove 230. The left hand end of rocker arm 235 as viewed in Fig. 9 is forked. As shown in the cut away view in Fig. 5 of equivalent parts at station C, one side of the forked portion is rotatably connected by a pin 231 to a block 232 running in groove 230 and the other side is similarly connected to a block 234 running in groove 230. Vertical motion is thus transmitted from rod 228 to the aforesaid left hand end of rocker arm 235 without interfering with the rotation of casting 144, on which arm 235 is mounted, about the vertical axis of shaft 135.

As shown here in Fig. 9, the linkage just described is positioned so as to hold pin 152 on dead center. Rocker arm 235 carries a depending arm 242 in which an adjusting screw 243 is mounted. In this position of the linkage, the inner end of screw 243 butts against flange 143 and provides an adjustable stop for accurately setting the center position of pin 152. Upon clockwise rotation of cam 117 from the position illustrated, the upper end of crank arm 207 will be carried outward, rotating shaft 206 counterclockwise and causing the outer end 211 of rocker arm 210 to travel downward. A downward movement is thus imparted to rod 214, and, through spring 223 and beam 219 to push rod 228, causing rocker arm 235 to rotate counterclockwise and push block 151 to the left. The block 148 mounted in way 147 carries an adjustable screw 244 which acts as a stop for block 151 and permits accurate setting of the extreme eccentric position of pin 152. It is apparent from the contour of path 209 on cam 117 that the eccentric shift mechanism will periodically move pin 152 from dead center to the eccentric position, and back, holding the pin in either position for a predetermined interval. As previously stated, shaft 135 to which casting 144 is attached, is continuously rotated, so that when pin 152 is in the eccentric position, gyratory motion in the horizontal plane is imparted to bracket 149.

Connected to the lower end of rocker arm 210 is a link 246 which runs transversely of the machine and is connected to a rocker arm 247 which is similar to rocker arm 210, but mounted in the reverse position. Rocker arm 247 is mounted on a shaft journalled on a bracket (not shown) similar to bracket 205, attached to the rear wall of the machine. The outer end 248 of rocker arm 247 is connected to a vertical rod having a yielding connection with a beam mounted longitudinally outside the rear wall of the machine and having an end connected to a push rod 249 running up through hollow shaft 139. The rear beam linkage, not shown in detail, is a duplicate of the front beam linkage shown in Figs. 5 and 9. Push rod 249 operates a rocker arm 250 which is connected through link 251 to slide block 163. Adjusting screws 251 and 252 serve to set the dead center and eccentric positions of pin 169 in the same manner as screws 243 and 244. The front and rear eccentric shift mechanisms operate simultaneously, both being driven by cam 117.

Figure 4:
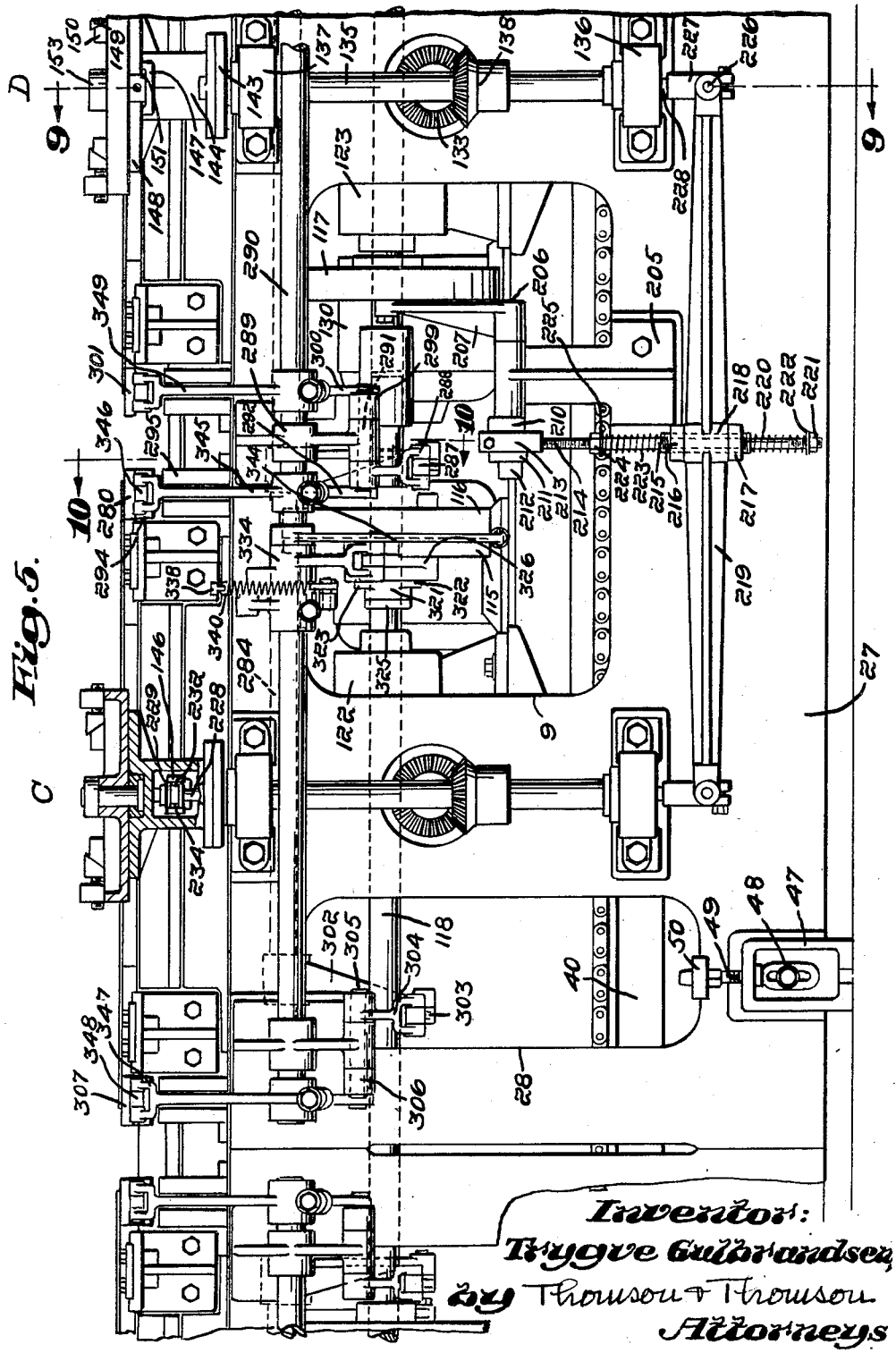
Fig. 4 is a front elevation of the first two loading stations corresponding to the station A and B of Fig. 1.

As shown in Fig. 5, the left hand end of beam 219 is connected to an eccentric shift linkage at station C on the front of the machine which is a duplicate of that at station D. The opposite end of the rear beam is connected to operate a similar linkage at the rear of the machine at station C. Cam 117 thus controls the operation of four eccentric shift linkages, two in the front, and two in the rear. As shown in Fig. 4, a second similar cam 369, mounted between stations A and B, controls similar front and rear eccentric shift mechanisms at those two stations, and a third cam (not shown), mounted between stations E and F controls duplicate shift mechanisms at the latter stations. The three eccentric shift cams are all driven by the main cam shaft 118 so that the eccentric shift mechanisms at all six stations operate in unison. The pair of front and rear rotating shafts exemplified by shafts 135 and 139 are driven by a separate motor at each station.

At each of the six shaker stations is mounted a placer and slicer board assembly similar to that at station D, shown in Figs. 7 and 9, except for the arrangement of the holes for the tile. The placer board 111 is mounted in a frame composed of angular side members 171 and 172 connected together by angular end members 173 and 174, the board being secured to the under side of the frame members by screws. A bracket 175, having a longitudinal slot 177 near its outer edge, is attached to member 171 and a similar bracket 176, having a longitudinal T-shaped slot 178, is attached to member 172. Bracket 149 carries an upstanding lug 179 in which is mounted a captive knurled knob 181 operating a lead screw 180. Screw 180 is threaded into a T-block 182 which fits into a slot 178. As shown in Figs. 7 and 18, bracket 149 also carries upstanding lugs 183 and 184 in which set screws 185 and 186 are mounted. As shown in detail in Fig. 18, set screw 185 engages a wedge block 187 which bears against a bevelled surface 188 of bracket 176. Set screw 185 is locked by a vertical set screw 189. Set screw 186 similarly engages a wedge block 190 which bears against a bevelled surface 191 of bracket 176. The wedge blocks provide for longitudinal adjustment of bracket 176 with respect to bracket 149, and lead screw 180 and T-block 182 for lateral adjustment, bracket 176 being slidable in both directions on bearing surfaces 192 and 193 of bracket 149.

Longitudinal adjustment of bracket 175 with respect to bracket 165 is provided by wedge blocks 194 and 195, bearing on bevelled surfaces 196 and 197 and secured in the same manner as blocks 187 and 190 by set screws 198 and 199 mounted in lugs 200 and 201 projecting from bracket 165. A block 202 mounted on bracket 165 projects into slot 177 and locks the two brackets together laterally, while permitting longitudinal adjustment. For adjustment purposes, bracket 175 is slidable on bearing surfaces 154, 155 and 156 of bracket 165. The placer board assembly is thus secured to brackets 149 and 165 and is longitudinally and laterally adjustable for accurate positioning over the pattern board. The assembly is longitudinally adjustable with respect to both brackets, but is fixed laterally to bracket 165 so that rotation of screw 180 carries bracket 165 sidewise, slot 167 allowing for this movement. When the placer board is locked in place, it is apparent that the gyratory motion periodically imparted to brackets 149 and 165 by the shaker mechanism, as previously described, is transmitted to the shaker board and serves to distribute the tile.

The mounting of the slicer board is illustrated in Figs. 7, 9 and 13 through 17. The board 112 is screwed to the bottom of a frame consisting of two angular side members 255 and 256, connected by two angular end members 257 and 258. Attached to frame member 257 are two blocks 259 and 260, which slide on bearing blocks 261 and 262 mounted on frame member 173 of the placer board. A pair of guide angles 263 and 264 are mounted on blocks 259 and 260 respectively, and are adjustable by means of screws, for example, screws 265 and 266 on angle 263, projecting through clearance holes in the angle. The guide angles bear against the side of member 173 and serve to align the slicer board frame with the placer board frame. A tension spring 267 is secured at one end to a post 268 mounted on the slicer board frame member 257, and at the other end to a post 269 mounted on the placer board frame member 173. An angle 370 mounted on member 257 projects over spring 267 to form a guard.

Mounted on member 255 is an adjustable stop, consisting of a threaded stud 270 locked by a nut 271. The inner end of the stud bears against frame member 172 of the placer board when the slicer board is in the right hand position as shown. The left hand end of member 257 projects beyond member 255 and carries a block 272 having depending lugs 273 and 274, Fig. 10, which act as a latch for engagement with the slicer mechanism about to be described. An adjustable rear stop, consisting of a threaded stud 275 locked by a nut 276, is mounted on member 256. The inner end of stud 275 engages member 171 when the slicer board is pulled by the slicer mechanism to the extreme left hand position. The upper end of the slicer and placer board assembly, as seen in Fig. 7, is constructed in the same manner as the lower end, shown in detail in Figs. 13 through 17, and also provided with adjustable front and rear stops 277 and 278, respectively, and a latch 274 for engagement with the slicer mechanism. A pair of handle brackets 371 and 372 are mounted on members 255 and 256, respectively, to facilitate manual manipulation of the slicer board in case of a jam. Several studs 279 may be inserted in the placer board and project slightly below its under surface to insure that a slight spacing is maintained between the placer and slicer boards for smoother operation.

The slicer mechanism at station C, which exemplifies the slicer mechanisms at the other loading stations, is illustrated in Figs. 5, 10, 11, and 12. A finger 280, which is designed to engage the latch lugs 273 and 274 at the leading end of the slicer board at station C, is driven by two linkages, one of which provides vertical motion, and one of which provides horizontal motion. The linkage which provides vertical motion is controlled by cam 116 which has a path 281 on its right hand face (as viewed in Fig. 5). A follower 282 rides in this path and is secured to a crank arm 283. The crank arm is secured to a rock shaft 284 which is journalled on a series of suitable bearing blocks only one of which, block 285, is shown. Shaft 284 runs the length of stations C and D, for the purpose of operating the slicer mechanisms at both stations, as will be further described. Also attached to rock shaft 284 is a crank arm 286, the lower end of which is connected to a link 287, which is in turn connected to a rocker arm 288. A strap 289, attached to the front wall of the machine, provides a bearing for a rock shaft 290, which runs the length of stations C and D, and has a depending arm carrying a short rock shaft 291 to which rocker arm 288 is attached. Connected to arm 298 of rocker arm 288 is a vertical rod 292, the upper end of which carries a pin 293 which engages a T-shaped block 294. The stem of block 294 slides vertically in a slotted block 295 which is mounted on the front wall of the machine, and the cross-piece of block 295 carries a horizontal way 296 in which is mounted a slide block 297 carrying the finger 280.

Figure 6:
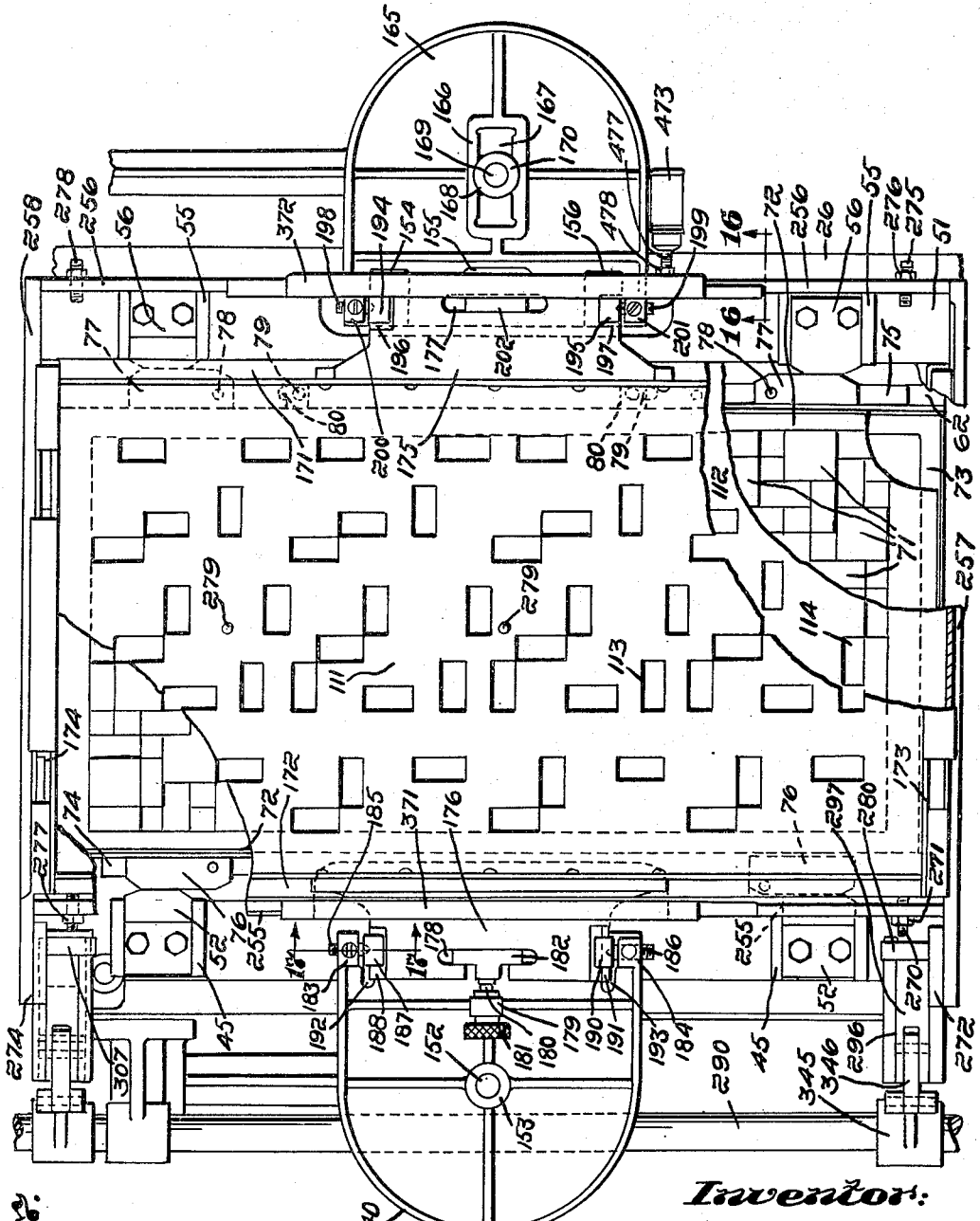
Fig. 6 is a front elevation of the loading stations corresponding to stations D and E of Fig. 1.

Attached to the right hand end of shaft 291 as viewed in Fig. 5 is an arm 299 similar in shape to arm 298. Arm 299 is connected to a vertical rod 300 which operates a second T-block mechanism, in every respect a duplicate of that shown in Fig. 10, and imparts vertical motion to finger 301 which engages the left hand latch of the slicer board at station D. Mounted on the left hand end of shaft 284, is a crank arm 302, a duplicate of arm 286, which operates through a link 303, an arm 304 similar in contour to the depending arm of rocker arm 288, a shaft 305 journalled on a strap attached to the front wall of the machine and an arm 306 similar to arm 299, to drive another vertical rod and T-block linkage such as that shown in Fig. 10, and impart vertical motion to finger 307 at the left hand side of station C. The mechanism for imparting vertical motion to the finger 308 at the right hand side of station D is shown in Figs. 6 and 8. A crank arm 309 mounted on the right hand end of shaft 284 as viewed in Fig. 6, is connected through a link 310 to an arm 311 similar to arm 299. Arm 311 is connected to a shaft 312 which is journalled on a strap 313, a duplicate of strap 289. Also connected to shaft 312 is an arm 314, similar to arm 299, which is connected through a rod 315 and T-block 316, so as to impart vertical motion to finger 308, the mechanism being in every respect a duplicate of that shown and described in detail with respect to Fig. 10.

One pair of fingers for engaging the slicer board latches at station C, and a second pair for engaging the slicer board latches at station D are thus operated in unison in the vertical direction by the motion of cam 116. In the same manner, a set of four latch fingers at stations A and B are driven vertically by four similar linkages controlled by cam 317, and a third cam (not shown) controls four similar linkages imparting vertical motion to a set of four latch fingers at stations E and F.

The mechanism which imparts horizontal motion to the finger 280 is illustrated in Figs. 5, 10, 11 and 12. This mechanism is controlled by cam 115, mounted on shaft 118 alongside of cam 116, and having a peripheral cam surface 320. Rotatably mounted alongside of cam 115 on shaft 118 is a block 321 having side ridges 322 and 323, and held by a collar 325 secured to the shaft. A forked arm 326 is slidably mounted on block 321, the forked portion being retained by ridges 322 and 323. To the right end of arm 326, as viewed in Fig. 10, is attached a cap 327 having an internal recess 328 which accommodates a compression spring 329. The right hand end of block 321 as viewed in Fig. 10 is recessed to provide a seat for spring 329. A plug 330, having a cut away rim 331 which forms a seat for the right hand end of spring 329, is slidably mounted in recess 328. A screw 332, the inner end of which bears against plug 330, is mounted in cap 327 and provides adjustment of the initial spring pressure. A cam follower roll 333 is mounted on arm 326 and engages cam surface 320. The left hand end of arm 326 is connected to an arm 334 journalled on rock shaft 290. An arm 335 is attached to shaft 290 alongside of arm 334 and carries at its upper end a pin 336 having a wide eccentric head 337. Rotatably mounted on pin 336 between the head and arm 335 is a lock plate 338 having a tooth 339 on its lower edge. Plate 338 is yieldingly urged downward by a tension spring 340 attached to a finger 341 mounted on the lower end of arm 335. Attached to the upper end of arm 334 is a plate 342 having a notch 343 with which tooth 339 is normally engaged. Rotation of arm 334, due to motion of cam arm 326, is thus transmitted through arm 335 to shaft 290. Attached to shaft 290 is an arm 345, the upper end of which is connected through link 346 to the slide block 297 which carries finger 280.

As apparent from Fig. 10, when cam follower 333, under the force of spring 329, is carried into a depression in surface 320 shaft 290 is rotated counterclockwise by the linkage just described, carrying slide block 346, with finger 280 to the left. As follower 333 engages a rise on cam surface 320, shaft 290 is rotated clockwise, carrying block 346, with finger 280, to the right. If the force of spring 329 is insufficient for proper operation, additional spring pressure may be provided by means of an auxiliary tension spring 347 anchored on the frame of the machine and connected to an arm 344, which is rotatably mounted on shaft 290 and connected to arm 326.

The cabs 115 and 116 are so constructed and aligned that, under the combined action of the vertical and horizontal slicer drive mechanisms, finger 280 is periodically raised to engage slicer latch block 271, moved to the left so as to engage lug 273 and carry the slicer board to the left, in which position the board is held for a short interval, returned to the right, engaging lug 274 and pushing the slicer board to the right, and then lowered out of engagement with latch block 271. The slicer board is thereafter retained in its extreme right hand position by its return springs, for example, spring 267.

If the slicer board should jam on its return, because of a tile stuck in one of the holes, tooth 339 will ride out of engagement with notch 343, allowing arm 334 to turn, without rotating shaft 290 and consequently moving finger 280 to the right. Tooth plate 338 and notch plate 342 thus act as an overload release which prevents damage to the slicer drive mechanism. When the cause of the jam has been removed, the slicer board, under the influence of its return springs, will return to the right hand position, lug 273 engaging finger 280 and carrying block 297 to the right. Shaft 290 with arm 335 is thus rotated into its normal operative position allowing tooth 339 to reengage notch 342.

As shown in Fig. 5, a second arm 347, a duplicate of arm 345 is mounted on the left hand end of rock shaft 290, and is connected through a link 348 to the slide block carrying finger 307 which engages the left hand slicer board latch at station C. A third similar arm 349 is mounted on shaft 290 and similarly connected to impart horizontal motion to finger 301 at the left hand side of station D, and a fourth similar arm 350 (Fig. 6) mounted on the right hand end of shaft 290, drives the finger 308 at the right hand side of station D.

The two pairs of slicer board latch engaging fingers, one pair at station C and one at station D, are thus driven simultaneously in the horizontal direction by the linkage controlled by cam 115, as well as vertically by the linkage controlled by cam 116 as previously described.

The mechanism imparting horizontal motion to the pairs of slicer board latch engaging fingers at stations E and F is in every respect a duplicate of that described with respect to stations C and D, and is not shown in detail. The corresponding mechanism for stations A and B, is also similar in every respect, as shown in Fig. 4, except that its controlling cam, cam 351, and the associated linkage to the rock shaft, are located near the right of station B, rather than station A, to avoid undue length of the main cam shaft 118. This shift in location involves no change in the construction and operation of the mechanism.

The wiring diagram for the electrical components of the machine is illustrated in Fig. 18. The wiring comprises a control network 400 and a power network 401. The machine is operated from a 550 volt three phase alternating supply connected to wires 402, 403, and 404. These wires are connected through a main switch 405 to a transformer 406 which steps the voltage down to 230 volts. The bank of drying lamps 407, which are mounted along the section of the conveyor marked "Drying" in Fig. 1, are connected to the 550 volt line through a pair of heaters 408, which operate a conventional thermal overload switch 408s, and a triple pole, normally open, contactor 409 operated by a relay coil 409c. Connected to the 230 volt line through a similar contactor 410, operated by relay coil 410c is a motor 411 which drives the rotating brush mounted at the conveyor station marked "Brush" in Fig. 1. The six shaker drive motors 412, 413, 414, 415, 416, and 417, which drive the continuously revolving shafts exemplified by shafts 135 and 139 (Fig. 9) of the shaker mechanisms at each of the six loading stations, are connected in parallel with the brush motor 411. Each of these seven motors is provided with its own manually operated panel switch, so that any one of the seven may be shut down separately, and connected through heaters operating thermal overload switches. The panel switches are numbered 418, 419, 420, 421, 422, 423, and 424. The heaters 425, 426, 427, 428, 429, 430, and 431 of the overload switches operate switches 425s, 426s, 427s, 428s, 429s, 430s, and 431s, respectively.

Also connected to the 230 volt line are the motor 121 which drives the main cam shaft 118, a vacuum pump 432 which powers the pneumatic pick-up device at the station marked "Unload" in Fig. 1, and a hydraulic pump 433 which supplies the hydraulic pressure to operate the conveyor drive thrustor. The main drive motor 121 is connected through a pair of heaters 434, which operate thermal overload switch 434s, and a normally open, triple pole contactor 435 operated by relay coil 435c. Motor 121 is also connected through a reversing circuit which by-passes contactor 435, and is controlled by a contactor 436 operated by relay coil 436c. A plugging switch 437, of a conventional centrifugal type which remains closed when the motor is running, is mounted on motor 121.

Pump 432 is connected through a pair of heaters 438, which operate thermal overload switch 438s, and a normally open triple pole contactor 439 operated by relay coil 439c. Pump 433 is connected through a pair of heaters 440 which operate thermal overload switch 440s, and a normally open triple pole contactor 441 operated by relay coil 441c.

The control network 400 is supplied with 230 volts from one branch of the 230 volt side of the transformer through leads 450 and 451 connected to a double pole manually operated switch 452, and consists of a number of branch networks connected in parallel between feed wires 453 and 454. One branch contains the secondary of a transformer 455 which supplies 115 volts to an exciter lamp 458, and a pair of photoelectric relays 456 and 457 of conventional construction, controlling contacts 486 and 487 respectively. The photoelectric relays are mounted one above the other at one end of the "Loading" area of the conveyor, and the exciter lamp, with suitable reflectors is mounted so as to project a beam of light back and forth the length of the loading area in such a manner that if an operator should put his hand into the loading area the light beam will be interrupted, causing one or the other of the photoelectric relays to become deenergized.

A second branch of the control network contains a synchronous timer 459, of conventional type, which periodically opens and closes a contact 460, for the purpose of intermittently energizing relay coil 409c and closing the circuit to the drying lamps. By adjusting the cycle of the timer, the temperature of the drying lamps may be regulated. A manualy operated panel switch 467 is connected in series with switch 460 so that the drying lamps may be shut off, if desired, without interfering with the operation of the machine.

At the left of the control network are three branches containing cam driven snapswitches 461, 462 and 463. Switches 461 and 462 control the energization of solenoids 464 and 465, respectively, which operate the hydraulic valves of the thrustor for the conveyor drive. Switch 463, when closed, energizes the solenoid 466 of the valve which controls the vacuum of the pneumatic pick-up device for unloading the completed sheets.

The circuit through the relay coil 439c which operates the vacuum pump contactor 439, and also to the main motor relay coil 435c, shaker and brush motor relay coil 410, the drying lamp relay coil 409c, and hydraulic pump relay coil 441c, is made through a manual momentary contact double-pole starter button 468, and a normally closed, manual stop button 469. Once relay coil 439c is energized, its holding contact 439s shunts out the starter button 468. The thermal overload switch 438s is connected in series with coil 439c, so that opening of this switch due to overheating of the vacuum pump motor will shut down the vacuum pump, and, through opening of contact 439s, the other four relay coils energized through the common starting circuit. A manual control switch 470 is also connected in series with coil 439c, and may be used for shutting down the machine.

Between the stop button 469 and the four relay coils 410c, 435c, 441c, and 409c, are connected in series a number of switches which provide overload and safety protection for the machine. First in the series are the thermal overload switch 440s of the hydraulic pump, the thermal overload switch 434s of main drive motor, the thermal overload switch 408s for the drying lamps, and the thermal overload switches 425s–431s for the brush motor and six shaker motors. Next in the series are six normally open snapswitches 471, 472, 473, 474, 475, and 476, one of which is mounted at each of the six loading stations. The mounting of switch 473, which exemplifies the mounting of the other five, is illustrated in Figs. 7 and 16. The switch is mounted in any convenient manner alongside of bracket 165, with its operating button 477 toward the conveyor. When the slicer board is in its extreme right hand position, a stud 478, mounted on the slicer board handle 372, engages button 477 and holds the switch closed. When the slicer board is drawn to the left, the switch snaps open and will remain open if the slicer board fails to return to its right hand position, as occasionally occurs when a tile gets jammed in one of the holes. The six slicer board jam switches are shunted out during part of the operating cycle of the machine by a cam operated switch 490.

Next in the series are three normally closed snap-switches 478, 479 and 480, which operate in conjunction with the three mechanical overload release devices exemplified by plates 338 and 342 in Figs. 10, 11, and 12. As previously explained, one of these release devices serves two stations. The mounting of switch 479 is typical of the arrangement of the other two switches. Switch 479 is mounted in any convenient manner above plate 338. When tooth 339 is engaged with notch 343, the operating button 481 of the switch is in its normal position. When the tooth rides up out of the notch because of a jam in the slicer board, as previously explained, the upper edge of plate 338 engages button 481 and opens the switch.

Connected between switch 480 and feed wire 454 are parallel circuit branches containing relay coils 410c, 441c, 435c and 409c. The first three coils are connected to wire 454 through a normally closed manually operated switch 485 which allows for independent operation of coil 409c, through switches 460 and 467, for the purpose of preheating the drying lamps. Coils 410c, 441c, and 435c, are each provided with a manually operated panel switch, switches 482, 483 and 484, respectively, so that any one of the three coils may be independently de-energized. The circuits to coils 441c and 435c are made through contacts 486 and 487, operated by photoelectric relays 456 and 457, respectively, and arranged to be closed when the relays are energized, that is, when the light beam across the loading area is uninterrupted. Contacts 486 and 487 are shunted out during part of the operating cycle of the machine by a cam operated switch 488. Coil 435c operates, in addition to contactor 435, a normally closed contact 489 connected in series with coil 436c.

For normal operation of the machine, the panel switches 470, 482, 483, 484, and 467, as well as those to the brush motor 411 and six shaker motors 412–417, are all closed. The main power switch 405 is closed to energize the system, and the switch 452 to the control network then closed energizing the photoelectric relays, their exciter lamp 468, and timer 459. Since plugging switch 437 is open, coil 436c remains de-energized. Assuming that all the thermal and mechanical overload switches are closed, and the slicer boards all in position to close the six snap-switches 471–476, pressing of starter button 468 energizes coil 439c, closing both contactor 439, to start the vacuum pump, and holding contact 439s, and makes the circuit to coils 410c, 441c, 435c, and 409c. If it is desired to preheat the drying lamps, switch 485 is held open for a short time, so that coil 409c alone is energized. When switch 485 is closed, coil 410c becomes energized, pulling in contactor 410 to start the brush and shaker motors. If the light beam across the loading stations is uninterrupted, coils 441c and 435c also become energized, closing contactors 441 and 435, respectively, to start the hydraulic pump and main drive motor, and simultaneously opening contact 489 in the circuit of coil 436c. As soon as motor 121 starts, plugging switch 437 closes. If, for any reason, coil 435c thereafter drops out, closing contact 489, coil 436c will be energized to close contactor 436, reversing the connections to the motor 121 and bringing the motor to a quick stop. As soon as the motor stops, switch 437 opens, de-energizing coil 436c and disconnecting the reversing circuit. The entire machine may be shut down by pressing stop button 469 or by the opening of contact 439s as the result of an overload condition which causes switch 438s to open. The opening of any of the overload contacts operatively connected in series between button 469 and coil 410c stops the main drive, hydraulic pump, brush, and shaker motors, leaving the vacuum pump running. As previously stated, the slicer board switches 471–476 are shunted out of the circuit during part of the operating cycle by cam switch 490. Interruption of the light beam in the loading zone, causing either contact 486 or 487 to open, shuts down the main drive and hydraulic pump motors, leaving the brush and shaker motors running. During part of the operating cycle, when an operator may reach into the loading zone without danger, for example, to supply tile to the placer boards, contacts 486 and 487 are shunted out by cam switch 488, so that all motors may remain running.

When the machine is in operating condition, with all motors running, motor 121 turns the main cam shaft 118 driving cam switches 464, 465, 466, 488 and 490, as well as the three sets of cams which control the eccentric shift and slicer board mechanisms at the six loading stations. The timing cycles of the cams and cam switches are illustrated in Fig. 19. The distance between the reference lines 500 and 501 is equivalent to one complete revolution of the main cam shaft 118, or a time interval of 15 seconds, for a shaft speed of 4 R. P. M. Lines 502, 503, and 504 represent the one-quarter, one-half, and three-quarter revolution points, respectively.

Line I indicates the eccentric shift motion, line II the vertical motion of the slicer drive, line III the horizontal motion of the slicer drive, line IV the operation of cam switch 490, line V the operation of cam switch 488, line VI the motion of the conveyor thrustor piston controlled by cam switches 464 and 465, and line VII the motion of cam switch 466 which controls the vacuum of the pneumatic unloading device.

For a period of slightly more than half the cycle, or about 8½ seconds, as indicated by the legend "Shake" on line I, the eccentric shift cams hold the pins which impart the shaking motion to the placer boards, in the manner previously described, in the eccentric position. During this part of the cycle, the fingers which engage the slicer board latches are held down out of engagement and remain stationary in the horizontal direction. The cam switch 490 is closed throughout the "shake" period, to prevent interruption of the circuit by accidental opening of one of the slicer board switches 471–476 due to the shaking motion. Switch 488 closes shortly after the shaking motion begins and remains closed almost to the end of this period, shunting out the photoelectric relay switches 486 and 487, so that an operator may reach into the loading area to replenish and scatter the supply of loose tile on the shaker boards to insure filling of the pockets. During the "shake" period, also, the conveyor piston travels through its "forward" stroke, advancing each pattern board one station on the conveyor. The vacuum of the pick up, and also its drive mechanism which is not shown in detail, are timed so as to pick a completed sheet from the pattern board before the conveyor starts to move. Thereafter, the pick up head is moved to a table, and the vacuum shut off releasing the sheet. During the latter half of the cam cycle, the pick up head is swung back over the conveyor, and the vacuum applied to pick up another sheet.

Shortly before the end of the "shake" period, the conveyor piston starts its "return" stroke, which continues through the rest of the cycle. As previously explained, no motion of the conveyor occurs during this stroke, as the spring latch fingers of the conveyor drive slide back freely under the board frames. Thus, the pattern boards remain stationary for about 9 seconds out of the cycle.

By the end of the "shake" period, switch 488 is closed, leaving the operating circuits through switches 486 and 487 dependent of the light beam, so that if an operator reaches into the loading zone thereafter, the main drive motor, which drives the cams operating the slicer mechanism, will be immediately shut down.

Shortly after the eccentric shift cam has reached the "idle" position, returning the drive pins of the eccentric shift mechanism to the dead center position, the vertical slicer cam operates the vertical slicer drive mechanism so as to raise the fingers into engagement with the slicer board latches. Thereafter, during the period marked "engage" on line II, the horizontal slicer drive mechanism moves and holds the slicer boards out, opening the placer board pockets so that the tile may drop through. The slicer boards are normally held out for about 1½ seconds. If, however, an operator should see that some of the tile have not dropped entirely through, he may safely reach in and free the tile, as the photoelectric relay switches will open, stopping the main drive motor and hydraulic pump to the conveyor drive. As soon as he removes his hand, the photoelectric relay switches close, and the machine automatically resumes operation. During the "return" stroke, of the horizontal slicer drive, the vertical drive lowers the slicer fingers out of engagement with the slicer board latches. Shortly after the end of this stroke, switch 490 opens, so that if any of the switches 471–476 remain open, because of a jammed slicer board, the main drive motor and hydraulic pump will be stopped. When the operator reaches in to free the jammed board, the photoelectric relay switches also drop out, preventing the motor and pump from starting until his hand is removed.

When the electrical system has been placed in operating condition, the operation of the machine to produce a tile sheet may be summarized as follows:

A supply of loose tile, of a size and color corresponding to the portions of the pattern which are to be filled in, is dumped on each placer board, during the "shake" part of the cycle, when the photoelectric relays are shunted out. The quantity of tile loaded on the placer board is not critical, but, for best results a supply somewhat in excess of the number of holes in the placer board should be maintained. The boards may be loaded by hand from bins alongside the machine, or by manually or automatically operated overhead storage bins. Because of the very effective distribution produced by the gyratory shaking motion, no particular care need be taken in loading the tile on the placer boards. The operator in the loading station ordinarily has no other duty than to replenish the tile on the boards from time to time. If a tile should become jammed in one of the slicer boards, however, he may safely reach in to push the jammed tile into its proper position, as the safety devices previously described automatically shut down the machine while he performs this operation. As soon as the jam is cleared, the machine automatically resumes operation, so that the shut down time is kept to a minimum. On leaving the final loading station, the filled pattern board passes under the revolving brush which pushes the tile all in one direction against the partitions, for accurate alignment of the sheets. At the inspection station, an inspector removes or turns over defective tile and fills in occasional unfilled spaces on the pattern board. Since a pattern board dwells at each station for about nine seconds out of the operating cycle, the two "inspection" stations illustrated in Fig. 1 allow for a total of 18 seconds to remedy defects. At the pasting station, gummed and moistened sheets of appropriate size are applied either by hand or by a conventional mechanical pasting device. The completed sheet then travels under the drying lamps mounted in the "drying" zone. The temperature of the lamps can be readily adjusted by means of timer 459 so that a sheet emerging at the unloading stations is completely dry. The completed sheet is then removed from the pattern board by the pneumatic pick up device, and the empty board travels around the end sprocket and back through the under part of the machine.

At the speed described, the machine delivers four boards a minute, and can be readily handled by two or three operators. Such manual operations as are necessary are so simple that an unskilled operator can quickly learn to perform them. Furthermore, the method of filling the pattern boards on this machine, insures accuracy and uniformity of even the most complicated patterns.

To change the pattern, the slicer, placer, and pattern boards are removed from their frames and replaced with a different set of boards, a relatively simple operation, and extra sets of boards can be stored in a minimum of space.

The machine here described is capable of producing patterns composed of up to six varieties of tile, but it is understood that the same type of loading mechanism and method may be employed for any number of loading stations.

I claim:

1. The method of assembling loose tiles into sheets of a predetermined pattern which comprises the following steps: placing a quantity of loose tiles on a series of arranging boards, each of which has pockets arranged to correspond to different selected portions of the pattern; imparting to said arranging boards a gyratory motion to distribute the tiles into said pockets; and placing a tile receiving board under each arranging board in turn, stopping said motion, and opening the pockets so as to deposit the tiles distributed therein onto said receiving board.

2. A machine for producing tile sheet from loose tiles comprising: a series of tile arranging boards sequentially arranged, each board having holes corresponding to different selected portions of a pattern to be produced; a number of closures normally covering the bottoms of said holes; means for agitating said boards to distribute loose tiles into said holes; a tile receiving board; means for aligning said receiving board in turn under each arranging board; and means operative when said receiving board is so aligned for opening the closures of the appropriate arranging board so as to uncover its holes and allow tiles contained therein to drop onto said receiving board.

3. A machine for producing tile sheet from loose tiles comprising: a continuous conveyor extending through a number of operating stations; a plurality of tile receiving boards attached to said conveyor; mechanism for driving said conveyor so as to cause each of said boards to dwell in succession at each of said stations; a plurality of tile arranging boards mounted above said conveyor at a sequence of said stations, each arranging board having holes corresponding to different selected portions of a tile pattern to be produced; a number of closures normally covering the bottoms of said holes; means for aligning the receiving boards, when they dwell at said sequence of stations, with said arranging boards; means for agitating said arranging boards to distribute tile into the holes thereof; and means operative, when receiving boards are so aligned, for moving said closures so as to uncover said holes and allow tiles contained therein to drop through on to the aligned receiving boards.

4. A machine as described in claim 3, provided with a synchronizing mechanism for stopping operation of said agitating means and operating said means for moving the closures during the periods when said receiving boards dwell at said stations.

5. A machine as described in claim 3, having a cylindrical, revolving brush disposed diagonally across the path of said conveyor at a point following the sequence of stations at which said arranging boards are mounted, the receiving boards having pattern-defining partitions of a height less than the thickness of one of the tiles, and the brush being disposed to sweep the upper faces of tiles lying on the receiving boards.

6. A machine for producing tile sheet from loose tiles comprising: a number of sequentially arranged tile devices adapted to fill in different selected portions of a pattern to be produced, each device comprising the following— a tile arranging board having holes corresponding to selected portions of the pattern, a closure board slidably mounted below said arranging board and having holes disposed to correspond with those of the arranging board, and a spring normally holding said closure board in a position in which its holes are out of register with those of the arranging board; means for agitating said devices to distribute loose tiles into the holes of the arranging boards; a tile receiving board; means for aligning said receiving board in turn under each arranging device; and means operative when said receiving board is so aligned, to move the closure board, of the appropriate arranging device, to a position in which its holes are in register with those of the arranging board, thereby allowing tile to drop through on to the receiving board.

7. A machine as described in claim 6, the means operative to move each closure board comprising a projecting lug attached to one side of said closure board; a finger slidably mounted adjacent to said lug; a first linkage adapted to reciprocate said finger into and out of engagement with said lug; and a second linkage adapted to move said finger, when engaged with said lug, and shift said closure board to a position in which the holes of the closure board are in register with the holes of the corresponding arranging board.

8. A machine as described in claim 2, in which said means for agitating the arranging boards comprises, for each arranging board, a continuously driven hollow shaft vertically disposed to one side of the arranging board; a table attached to the upper end of said shaft; a bracket slidably mounted on said table and connected to the arranging board; a pin slidably mounted on said table and rotatably engaging said bracket; a rocker arm supported from said table and rotatable about a horizontal axis, one end of said arm being connected to said pin; a vertically slidable rod mounted in said shaft, having its upper end connected to the other end of said rocker arm; and means for moving said rod vertically, thereby shifting the position of said pin on said table.

9. In a machine as described in claim 3, a mechanism for agitating a pair of arranging boards, designated a first and a second board, disposed at a pair of adjacent stations in the sequence, comprising: a first vertical hollow shaft disposed to one side of said first board; a first table connected to the upper end of said shaft; a first bracket connected to said first board and slidably mounted on said table; a first pin slidably mounted on said table and rotatably engaging said bracket; a first vertically slidable rod mounted in said shaft, a first rocker arm, supported from said table, having one end connected to said pin and the other end connected to said rod; a second vertical hollow shaft disposed to one side of said second board; a second table connected to the upper end of said second shaft; a second bracket connected to said second board and slidably mounted on said second table; a second pin slidably mounted on said second table and rotatably engaging said second bracket; a second vertically slidable rod mounted in said second shaft; a second rocker arm supported from said second table having one end connected to said second pin and the other end connected to said second rod; means for continuously driving said shafts; a cross-beam connecting the lower ends of said rods; and means for moving said cross-beam vertically, thereby shifting said pins on said tables.

10. A machine as described in claim 6, the means operative to move each closure board to the position in which its holes are in register with those of the associated arranging board including a rock shaft, means connected to said shaft for converting rocking motion of the shaft to sliding motion and transmitting the sliding motion to the closure board, a first plate rotatably mounted on said shaft and a second plate fixed to said shaft, one of said plates having a notch and the other having a movable tooth engageable with said notch, means for driving said first plate with a rocking motion about the shaft axis, and a spring normally maintaining said tooth engaged in said notch whereby motion of the first plate is transmitted to said shaft, the tooth being releasable from the notch in the event that motion of the closure board is obstructed.

11. The method of assembling loose tiles into sheets of a predetermined pattern composed of tiles differing in color, size, shape, or orientation in the pattern, which comprises the following operations: placing a quantity of loose tiles on a number of arranging boards, each of which has a number of closed pockets arranged to correspond to different selected portions of the patterns which are to be formed by one particular variety of tile, all the tile placed on any one board being of the appropriate particular variety; imparting a gyratory motion to the boards to distribute the tiles into the pockets; and placing a tile receiving board under each arranging board in turn, stopping the motion, and opening the pockets of each board to deposit tile distributed therein on to the receiving board, thereby successively filling in the pattern.

12. The method of assembling loose tiles into sheets of a predetermined pattern composed of tiles differing in color, size, and shape, making up a complete sheet, which comprises the following operations: placing a quantity of loose tile on a number of arranging boards, each of which has a number of closed pockets distributed generally over an area corresponding to that of a complete sheet and corresponding to different selected parts of the pattern to be formed by a particular variety of the tile, all the tile placed on any one board being of the appropriate particular variety; imparting a gyratory motion to the boards to distribute tile into the pockets; aligning a tile receiving board under one of the arranging boards, under the area corresponding to that of the sheet; stopping the motion of that arranging board; and simultaneously opening all the pockets of that arranging board, thus simultaneously depositing tiles on to the receiving board in all the parts of the pattern to which the pockets correspond; and repeating the latter operation with respect to each of the arranging boards until the sheet pattern is completed.

References Cited in the file of this patent

UNITED STATES PATENTS

| Number | Name | Date |
| --- | --- | --- |
| 490,467 | Allaeys | Jan. 24, 1893 |
| 702,328 | Parker | June 10, 1902 |
| 949,902 | Karazej et al. | Feb. 22, 1910 |
| 1,315,166 | Semashko | Sept. 2, 1919 |
| 1,724,764 | Jones | Aug. 13, 1929 |
| 1,745,823 | Yingling | Feb. 4, 1930 |
| 2,181,573 | Bunker | Nov. 28, 1939 |